(No Model.)
J. DICKENS.
LAWN SPRINKLER.
No. 517,544. Patented Apr. 3, 1894.
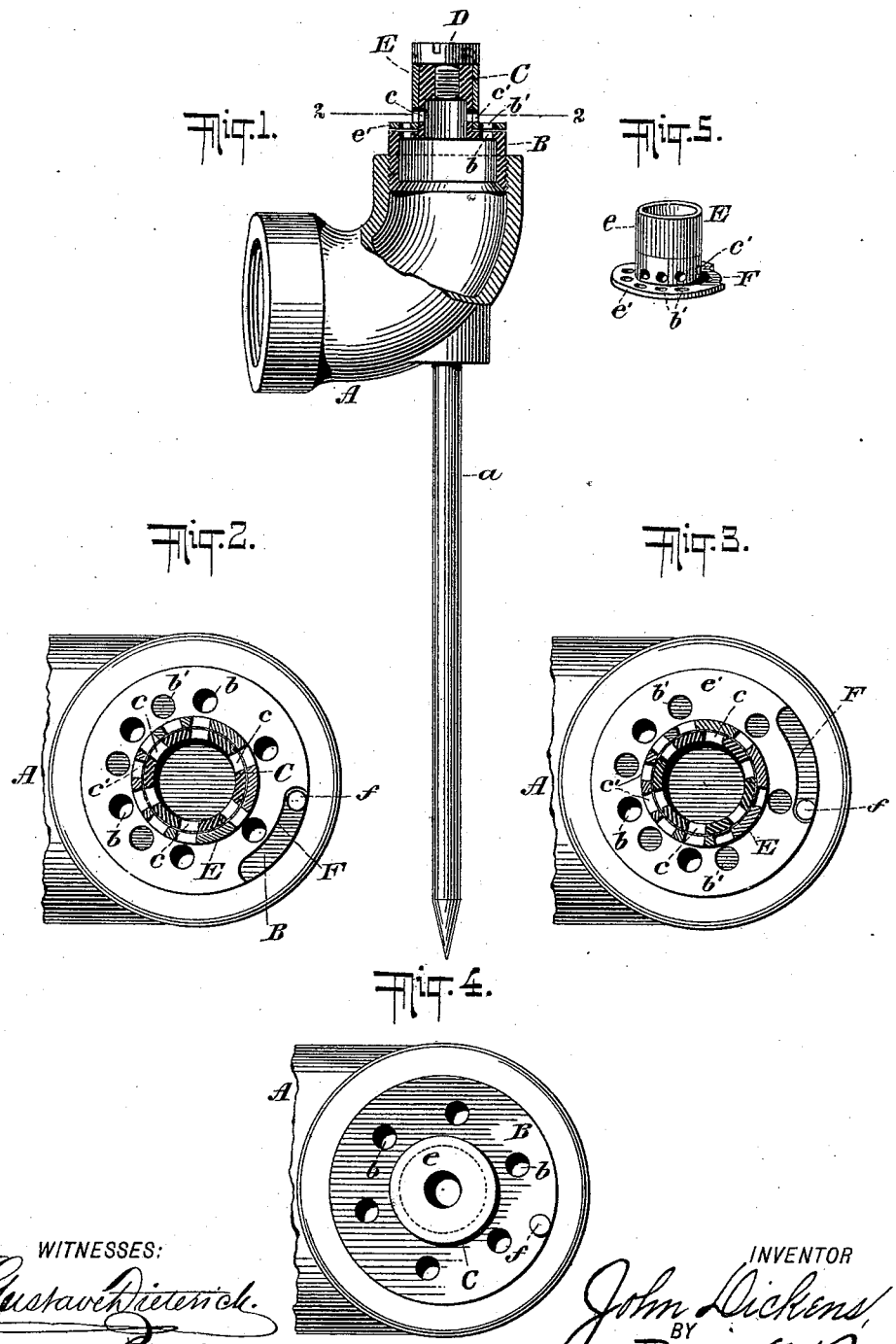

UNITED STATES PATENT OFFICE.

JOHN DICKENS, OF NEW BRUNSWICK, NEW JERSEY, ASSIGNOR TO THE DICKENS MANUFACTURING COMPANY, OF SAME PLACE.

LAWN-SPRINKLER.

SPECIFICATION forming part of Letters Patent No. 517,544, dated April 3, 1894.

Application filed December 15, 1893. Serial No. 493,747. (No model.)

*To all whom it may concern:*

Be it known that I, JOHN DICKENS, a citizen of the United States, and a resident of New Brunswick, in the county of Middlesex and State of New Jersey, have invented certain new and useful Improvements in Lawn-Sprinklers, of which the following is a specification.

My invention relates to a lawn sprinkler, or attachments for hose adapted to distribute a stream of water over a large area and in finely divided particles.

The object of the invention is to provide a simple device which will cause the water to be sprayed at great distance from the outlet in minute particles and which can be adjusted to confine the outlet for the water so that it will only be distributed on one side of the sprinkling device, for the purpose hereinafter particularly pointed out.

With these and other ends in view, the invention contemplates supplying at the end of a hose, or a coupling fitted thereto, a collar from which a hollow stem projects and is closed by an adjustable screw, a series of openings in the collar and a corresponding series of openings in the stem close to the collar, and a sliding cut-off arranged on the stem and collar and provided with openings which register with those in the stem and collar and so disposed that all the openings, or only those on one side, may be uncovered by adjusting the sliding cut-off.

My invention consists further of certain details of construction and arrangements of parts which will be fully described and claimed hereinafter.

To enable others to more readily understand the invention I have illustrated the same in the accompanying drawings, in which—

Figure 1, is a view, partly in section, showing my improved sprinkling devices adapted to an elbow coupling. Figs. 2 and 3 are sectional views on the line 2—2 Fig. 1, and illustrate the cut-off in different positions, showing the sprinkler adapted to distribute the water on all sides in Fig. 2, and on one side in Fig. 3. Fig. 4 is a top plan view of the device with the cut-off removed, and Fig. 5 is a detail view of the cut-off.

Referring to the drawings, in which like letters of reference denote corresponding parts in all the figures, A designates an ordinary elbow coupling, which may be of any suitable size and shape, and to which is secured a pin-support $a$ arranged in vertical alignment with the outlet of the coupling and adapted to be inserted in the ground to support the sprinkling devices.

I have illustrated the devices in connection with an elbow coupling, as above described, which is a very convenient embodiment of my invention, but I do not limit myself to this particular adaptation as it will appear that the devices may be arranged in any suitable manner at the end of a hose, a supply pipe, in a nozzle or in any water outlet of a similar character, with only such immaterial modifications as are necessary to adapt it for each special purpose and situation. I will proceed, however, to describe the invention as applied to an elbow coupling, in the manner illustrated, with the same force and effect as if described and claimed in each particular relation in which it may be used.

In the end of the coupling, which, for the purpose of this invention, is preferably maintained in a vertical position, is securely fitted a collar B which is provided with a series of openings $b$ disposed at suitable intervals and leading into the coupling. A hollow stem C projects outward from this collar B and is also provided with a series of openings $c$ in radial alignment with the openings $b$. The upper end of the hollow stem is threaded interiorly to receive a headed screw D whose head projects beyond the periphery of the stem for a purpose hereinafter specified. A sliding cut-off E is arranged on the stem C and it comprises a tube $e$, fitting snugly on the stem, and a peripheral plate $e'$ which rests upon the collar B. This cut-off is provided with openings $b'$ and $c'$ which are arranged to register with the openings $b$ and $c$ respectively. The plate $e'$, which forms a part of the cut-off, is recessed at F to provide for the pin $f$ which is rigid with the collar B and serves to limit and control the movement of the cut-off. The upper portion of the stem C is serrated or roughened to facilitate the operation of adjusting the cut-off by turning it within the limits of the recess F. The screw D can be adjusted to prevent the cut-off becoming too free and loose in its movement, as the head thereof projects beyond the stem and lies flush with the tube e.

In the drawings I have shown the collar and stem each provided with six openings and the plate e' and tube e of the cut-off each provided with nine openings, said openings being disposed in a peculiar manner to accomplish a new and useful result which I will now describe. In devices of this character, which are sometimes placed in operation and allowed to remain in one position for some time, it is often desirable to spray flowers, hedges, running plants and corners of lawns without distributing the water on all sides of the outlet. It will therefore be observed that by simply turning the cut-off E I am able to discharge the water from one side only, or on all sides of the sprinkler, as desired. I have shown in the drawings and described, for convenience, a given number of openings adapted to discharge the water on one side or on both sides of the outlet, but it is obvious that this number of openings may be enlarged or decreased, as desired, and they may also be so arranged as to discharge the water in any number of directions by disposing them at the proper intervals. When the cut-off is turned into the position shown in Fig. 2 it will be observed that six openings are clear and the water will be distributed on all sides of the sprinkler; and when the cut-off is turned to the opposite direction only three openings, on one side of the device, as shown in Fig. 3, are clear which will confine the distribution of the water to one side of the sprinkler. By this means, the sprinkler may be placed in the center of a lawn and it will distribute the water on all sides, when arranged as shown in Fig. 2, or it can be placed close to the side of a house without throwing any water thereon, if arranged as shown in Fig. 3. When the water is turned on at the source of supply it will rush out of the vertical openings in the collar and plate in fine streams, and strike with great force the streams coming at right angles thereto from the horizontal openings in the stem, resulting in a complete breaking up of the solid streams into small particles which are distributed over a large area in the form of fine spray. I have found that the streams are more completely and thoroughly broken up and divided when they strike each other substantially at right angles, the force of the impact being much greater and thereby resulting in a finer separation of the particles of water, than when they are arranged at other angles, but I do not limit myself to this precise construction.

A convenient form of manufacturing the device is shown by the drawings, but I may also make the collar, and parts supported thereon, as an article of manufacture and sell them ready to be inserted, in a proper manner, in the end of a nozzle or hose, and in other ways obvious to persons practicing the invention.

I am aware that changes in the form and proportion of parts and details of construction of my invention may be made without departing from the spirit or sacrificing the advantages thereof, and I therefore reserve the right to make all such changes and modifications which fall within the scope of the invention.

Having thus fully described my invention, what I claim as new, and desire to secure by Letters Patent, is—

1. A sprinkler, consisting, essentially, of a collar adapted to be secured in a hose or coupling and having a series of openings therein, a hollow stem extending out from said collar and having a series of openings near its base arranged in radial alignment with the openings in the collar so that the streams of water issuing from said openings will strike at right angles, and a cut-off having openings arranged to register with the openings in the collar and stem and adapted to be operated to disclose a greater or less number of the openings in the collar and stem, substantially as and for the purpose set forth.

2. A sprinkling device, consisting of a collar having a series of openings therein, a stem extending out from said collar and having a corresponding series of openings, said series of openings being in different horizontal planes, so that the streams of water issuing from said openings will strike substantially at right angles and thereby distribute the water in the form of finely divided spray, substantially as described.

3. A sprinkler, consisting, essentially, of a collar having a series of vertical openings therein, a hollow stem extending out from said collar and having a series of horizontal openings near its base, corresponding to and in radial alignment with the openings in the collar, a cut-off arranged to fit snugly over the collar and stem and having openings adapted to register with openings in the collar and stem and disclose a greater or less number thereof, and a headed screw arranged in the end of the stem to close the same and adapted to retain the cut-off in place, substantially as described.

4. A sprinkler, comprising a collar having a series of openings therein, a stem extending out from the collar and having a series of openings arranged in radial alignment with the openings in the collar, a cut-off arranged over said collar and stem and provided with openings to register with openings in the collar and stem, and means for limiting the movement of said cut-off, substantially as described.

5. A sprinkler, consisting of a collar having a series of openings therein, a stem extending out from said collar and having a series of openings in radial alignment with the openings in the collar, a cut-off comprising a peripheral plate arranged on the collar and a tube fitting snugly on the stem, said cut-off having a limited movement and being provided with openings to register with openings in the collar and stem and disposed so as to disclose a different number of openings in the collar and stem when the collar is turned into different positions, substantially as described.

6. A sprinkler, consisting of a collar and a stem rigid therewith, said collar and stem being provided with openings arranged in radial alignment, and a cut-off fitted snugly on said collar and stem and provided with openings adapted to register with openings in the collar and stem and so disposed that said cut-off may be operated to confine the discharge of water to openings on one or more sides of the sprinkler or on all sides, as described.

7. The combination with a pipe or coupling of a collar secured in the end thereof and having a series of vertical openings therein, a hollow stem extending out from said collar and having a series of horizontal openings in radial alignment with the openings in the collar, a cut-off comprising a peripheral plate arranged on the collar and a tube fitted snugly on the stem, said plate and tube being provided with openings to correspond with openings in the collar and stem, a headed screw arranged in the end of the stem to close the same and retain the cut-off in place, a recess in said peripheral plate, and a pin rigid with the collar and projecting up in said recess to limit the movement of the cut-off, substantially as described.

Signed at New Brunswick, in the county of Middlesex and State of New Jersey, this 12th day of December, A. D. 1893.

JOHN DICKENS.

Witnesses:
WILLARD P. VOORHEES,
A. J. JONES.